(12) United States Patent
Hasselbring

(10) Patent No.: US 6,711,799 B1
(45) Date of Patent: Mar. 30, 2004

(54) METHOD AND DEVICE FOR TIGHTLY FIXING A PIECE OF FLEXIBLE TUBING CONSISTING OF AN ELASTOMER MATERIAL TO A CONNECTING PART

(75) Inventor: Bernd Hasselbring, Lindwedel (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 0 days.

(21) Appl. No.: 10/048,213
(22) PCT Filed: Jul. 21, 2000
(86) PCT No.: PCT/EP00/07005
§ 371 (c)(1),
(2), (4) Date: Jan. 30, 2002
(87) PCT Pub. No.: WO01/09541
PCT Pub. Date: Feb. 8, 2001

(30) Foreign Application Priority Data

Jul. 30, 1999 (DE) .......................... 199 35 402

(51) Int. Cl.⁷ .......................... B23Q 17/00; B23P 11/00
(52) U.S. Cl. .................. 29/407.01; 29/407.01; 29/516
(58) Field of Search .......................... 29/407.01, 407.02, 29/407.03, 407.05, 407.08, 525, 525.02, 525.05, 240, 516, 508, 705; 81/470; 173/183; 72/19.8, 21.2, 21.4

(56) References Cited

U.S. PATENT DOCUMENTS 4,280,380 A    7/1981    Eshghy

FOREIGN PATENT DOCUMENTS

EP    0 548 627    6/1993
JP    02 099233    4/1990

*Primary Examiner*—John C. Hong
(74) *Attorney, Agent, or Firm*—Walter Ottesen (57) ABSTRACT

The invention relates to a method for tightly attaching a piece of flexible tubing of an elastomeric material to a connecting part, especially for attaching air bellows for pneumatic springs to a connecting part with a clamping ring, which is radially pressed using a pressing tool. The force-displacement characteristic line (16) of the pressing tool is recorded while the clamping ring is being radially pressed, in order to carry out the method. This force-displacement characteristic line (16) is used to determine the lost force that is required in the pressing tool for the plastic deformation of the clamping ring and for overcoming the inner friction of the pressing tool. This lost force is used for adjusting the additional force resulting from the pressing tool being moved together in such a way that it corresponds to a predetermined force between the piece of flexible tubing and the connecting part. The invention also relates to a pressing tool for carrying out this method.

8 Claims, 7 Drawing Sheets

METHOD AND DEVICE FOR TIGHTLY FIXING A PIECE OF FLEXIBLE TUBING CONSISTING OF AN ELASTOMER MATERIAL TO A CONNECTING PART

FIELD OF THE INVENTION

The invention relates to a method for seal-tightly attaching a flexible tubing of elastomeric material, especially of flexible members for air springs, to a connecting part by means of a clamping ring, which is radially pressed by a clamping tool. The invention further relates to a clamping tool for carrying out the method.

BACKGROUND OF THE INVENTION

It is known to use a radially pressed-together metal clamping ring for pressing the end of a flexible member to the roll-off piston or to the cover of an air spring. The radial pressing of the clamping ring takes place with a clamping tool which comprises individual clamping jaws arranged to have a circular form. When clamping the clamping ring, the individual clamping jaws are moved so far toward each other until the required clamping between the wall of the flexible member and the connecting part (roll-off piston or cover of the air spring) is achieved.

What is decisive for the quality of the attachment of the flexible member is the precise achievement of the necessary clamping between the wall of the flexible member and the clamping region. The clamping cannot be too little because, in this case, the friction force, which results from the clamping, between the wall of the flexible member and the connecting part and therefore the required holding force of the wall of the flexible member on the connecting part is reduced. Likewise, the clamping force may not be too great because then the wall of the flexible member as well as the connecting part can be damaged. Furthermore, a clamping force which is too high and a deformation of the connecting part resulting therefrom can likewise lead to a reduction of the holding force.

Basically, two methods are known for attaching a flexible member to a connecting part of an air spring. In the one method, the clamping jaws of the clamping tool are moved toward each other with the force controlled, that is, the clamping operation is stopped when the force, which is generated by the clamping tool, corresponds to a pregiven force. The disadvantage of this method is that force tolerances can result in the total system and the force, which is generated by the clamping tool, therefore is not in a clear relationship to the force which arises between the flexible member and the connecting part.

Thus, it is, for example, possible that increased friction within the clamping tool occurs because of the deterioration thereof. In this case, an increased part of the force, which is applied by the clamping tool, has to be used to overcome this friction. For the same pregiven total force which the clamping tool generates, the force becomes less which adjusts between the flexible member and the connecting part as a consequence of the pressing of the clamping ring.

It is likewise possible that, when carrying out the method, clamping rings of different hardness are used. Only a small force is required to deform a soft clamping ring, whereas a large force is required for deforming a hard clamping ring. If a pregiven total force is generated in both cases by the clamping tool, then this leads, in the first case, to the situation that the force between the flexible member and the connecting part is increased and, in contrast, this force is reduced in the second case. Finally, the connecting part itself can have different stiffnesses, which, for a pregiven total force of the clamping tool, likewise leads to the situation that different forces adjust between the flexible member and the connecting part.

In the other known method, the clamping jaws of the clamping tool are moved together in a displacement-controlled manner, that is, a clamping operation is ended as soon as the clamping jaws have passed through a pregiven path. This method has the disadvantage that dimension tolerances in the components lead to different forces between the flexible member and the connecting part. If, for example, a clamping ring is used whose cross section lies below the pregiven cross section because of manufacturing tolerances, then this leads to a reduction of the force between the flexible member and the connecting part. On the other hand, the use of a clamping ring whose cross section lies above the pregiven cross section, leads to an increased force between the flexible member and the connecting part.

In summary, it can be said that, with neither of the two above-mentioned methods, flexible members can be connected to the connecting parts of air springs in such a manner that a pregiven defined force adjusts between the flexible members and the connecting parts of the air spring, which is the same for all manufactured air springs.

SUMMARY OF THE INVENTION

The invention has as its task to provide a method with which the clamping ring, which is used for attaching a flexible member to a connecting part, can be radially clamped in such a manner that a defined pregiven force adjusts between the flexible member and the connecting part. The invention likewise has the task of providing a clamping tool for carrying out the method.

According to the invention, the task is solved starting from a method of the above-explained type with the following method steps:

- a force-displacement characteristic line of the clamping tool is determined, which is recorded during the radial clamping of the clamping ring with the recording being started before the connecting part, the flexible member and the clamping ring lying one against the other without force and without play;
- the loss force, which is necessary for overcoming the friction in the clamping tool, is determined from the force/displacement characteristic line;
- the force, which exceeds the loss force, is so adjusted that it corresponds to a pregiven force between the flexible member and the connecting part.

The advantages, which are achieved with the invention, are especially seen in that a defined pregiven force between the flexible member and the connecting part can be adjusted independently of "force tolerances" in the system (for example, different friction within the clamping tool or different hardness of the individual used clamping rings) and independent of dimension tolerances of the individual used components (that is, of the flexible member, of the connecting part and of the clamping ring). For this reason, neither a force which is too high nor a force which is too low can develop between the flexible member and the connecting part so that the initially-explained disadvantages and the disadvantages associated therewith cannot occur. A further advantage of the method is that it is simple to carry out and therefore the costs of a component manufactured in accordance with the method are not increased.

According to a first embodiment of the invention, the loss force is determined in the region of the force/displacement characteristic line in that the clamping tool is moved together so far that the connecting part, the flexible member and the clamping ring lie in contact with each other free of force and free of play.

It has been shown that the force/displacement characteristic line, which arises during the clamping action of the clamping tool, is essentially a straight line before and behind the region wherein the connecting part, the flexible member and the clamping ring lie one atop the other free of force and free of play. The straight lines have different slopes. According to a further embodiment of FIG. 3 of the embodiment of FIG. 2, the loss force is determined at that point at which the lines intersect (see the description with respect to the FIGS. as to how this occurs in detail). The advantage of this further embodiment is that the loss force can be determined in a simple manner at one point.

According to a further embodiment of the invention, the loss force is determined as follows:

the straight line ahead of the region (in which the clamping tool is moved together so far that the connecting part, the flexible member and the clamping ring lie one atop the other free of force and free of play) is extended beyond this region as a straight line;

from the extended line, during the further closing of the clamping tool for each path which the clamping tool has passed through beyond the above-mentioned region, the loss force corresponding thereto is determined.

The advantage of this further embodiment is that the loss force is exactly determined anew at each point during the radial clamping of the clamping ring after the clamping ring has come into contact at the flexible member. Starting from this exactly determined loss force, the pregiven force between the flexible member and the connecting part is adjusted (see the description of the FIGS. for more).

According to a further embodiment of the invention, the force/displacement characteristic line, which forms the basis of the determination of the loss force, is recorded anew at time intervals. This further embodiment is based on the idea that specific parameters, for example, the friction within the clamping tool, do not change with each clamping operation but only very slowly over a longer time span. Accordingly, the loss force can be determined with adequate accuracy based on a force/displacement characteristic line which has been determined once, if, during the repeated execution of the method, always the same components are used, that is, the same connecting part, the same flexible member and the same clamping ring (this is always the case in the manufacture of one charge). It has been established that the method according to the invention can be carried out with adequate accuracy when the established force/displacement characteristic line on the basis of which the loss force is determined is recorded anew every 100 to 10,000 clamping operations. The advantage of the further embodiment is that the force/displacement characteristic line only has to be recorded once for many clamping operations.

According to the further embodiment of the invention, the force/displacement characteristic line is recorded each time during clamping of a clamping ring and this recorded force/displacement characteristic line, during the clamping of this clamping ring, forms the basis for determining the loss force. The advantage of this further embodiment is that it makes possible an execution of the method with the largest possible accuracy. If it happens that for a charge of used clamping rings, which should all have the same hardness, one clamping ring exhibits a hardness deviating therefrom, then the magnitude of the loss force is influenced thereby. However, this is determined based on the actually recorded force/displacement characteristic line during clamping of this clamping ring so that also in this case, the defined pregiven force between the flexible member and the connecting part can be exactly adjusted (in contrast thereto, such a deviation could not be detected with the previous embodiment).

According to a further embodiment of the invention, the recordation of the force/displacement characteristic line is started before the clamping tool comes into contact with the clamping ring. The advantage of this embodiment is that the entire force/displacement characteristic line is recorded, which the clamping tool runs through during clamping of a clamping ring. From the total force/displacement characteristic line, additional information can be obtained in addition to the loss force. Accordingly, it can be determined from the force/displacement characteristic line how high the friction force within the clamping tool is. If this friction force exceeds a specific value, then maintenance of the clamping tool can be undertaken. Furthermore, it can be determined from the entire force/displacement characteristic line, for example, when the clamping jaws of the clamping tool come in contact with the clamping ring for the use of a charge of clamping rings, which all should have the same cross section. If contact does not take place after the clamping tool has run through a specific displacement, then this is an indication that, because of inadvertence, a non-suitable clamping ring has been placed in the clamping tool (if the cross section of the clamping ring, for example, is significantly too large because an incorrect clamping ring was placed), then this leads to the situation that the clamping jaws of the clamping tool come into contact with the clamping ring significantly earlier than if a proper clamping ring had been placed.

BRIEF DESCRIPTION OF THE DRAWING

The invention will now be explained with reference to the drawings wherein.

DESCRIPTION OF THE PREFERRED EMBODIMENTS OF THE INVENTION

FIG. 1 shows, in schematic representation, a clamping tool 2 known per se for attaching a hose piece in the form of a flexible member 4 to a connecting part 6, which, for example, is part of an air spring (in this case, the connecting part 6 is the cover or the roll-off piston of the air spring). The clamping tool 2 includes individual clamping jaws 8 arranged in the shape of circles of which only one is schematically represented in FIG. 1. The clamping jaws 8 are displaceable by the clamping tool 2 in the axial direction. This can, for example, take place with the mechanism shown in FIG. 1. To displace the clamping jaws 8 in the radial direction, a force $F_P$ must be generated by the clamping tool and this force is converted into a force $F_R$ with which the clamping jaws are moved toward each other. The force $F_P$, which is generated in the clamping tool 2, is measured by a force sensor for establishing a force/displacement characteristic line. The force sensor can, for example, be mounted in the hydraulic unit 30 of the clamping tool 2 with which the force $F_P$ is generated. Furthermore, the clamping tool includes a displacement sensor 32 with which the diameter between the clamping jaws is determined.

Figure 1A:
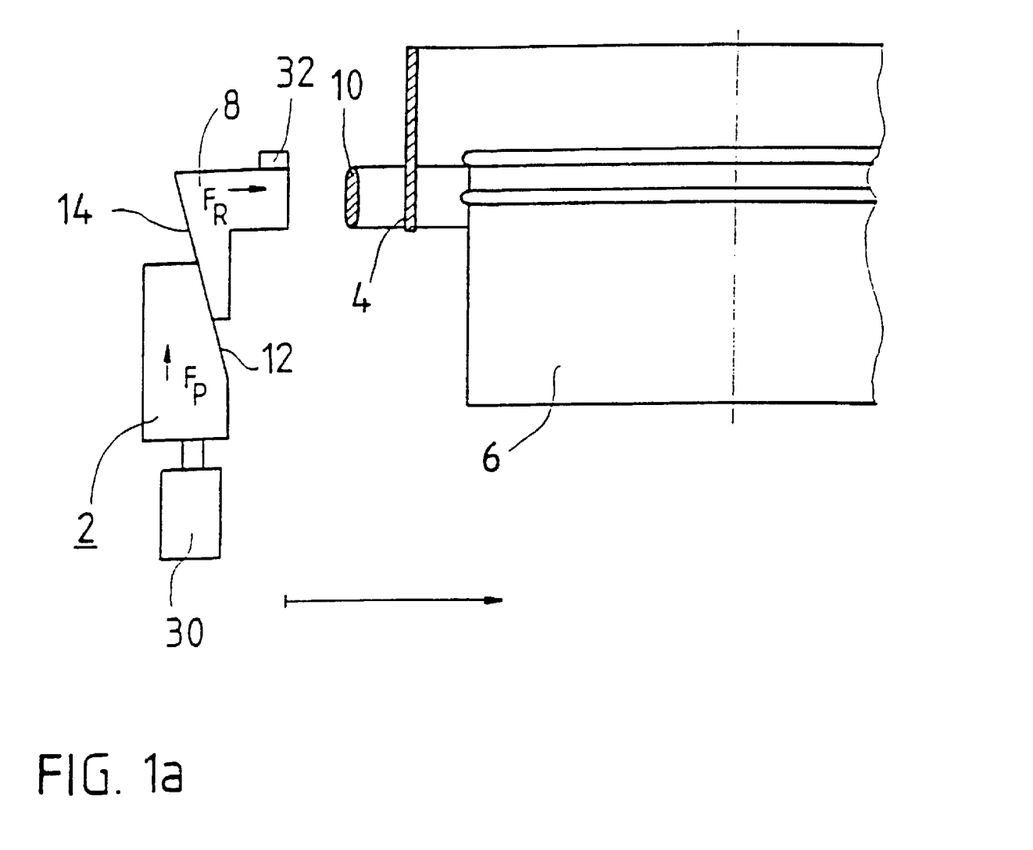
FIG. 1 is a clamping tool for attaching a flexible member to a connecting part.

As the clamping jaws 8 are moved toward each other, they first pass through an air gap until they come into contact with the clamping ring 10 which coaxially encloses the flexible member 4 (see FIG. 1a). During the movement through the air gap, the force $F_P$, which is generated by the clamping tool 2, need only overcome the sliding friction present in the clamping tool (in the example shown, the sliding friction arises because of the inclined planes 12 and 14 which slide on each other).

Figure 1B:
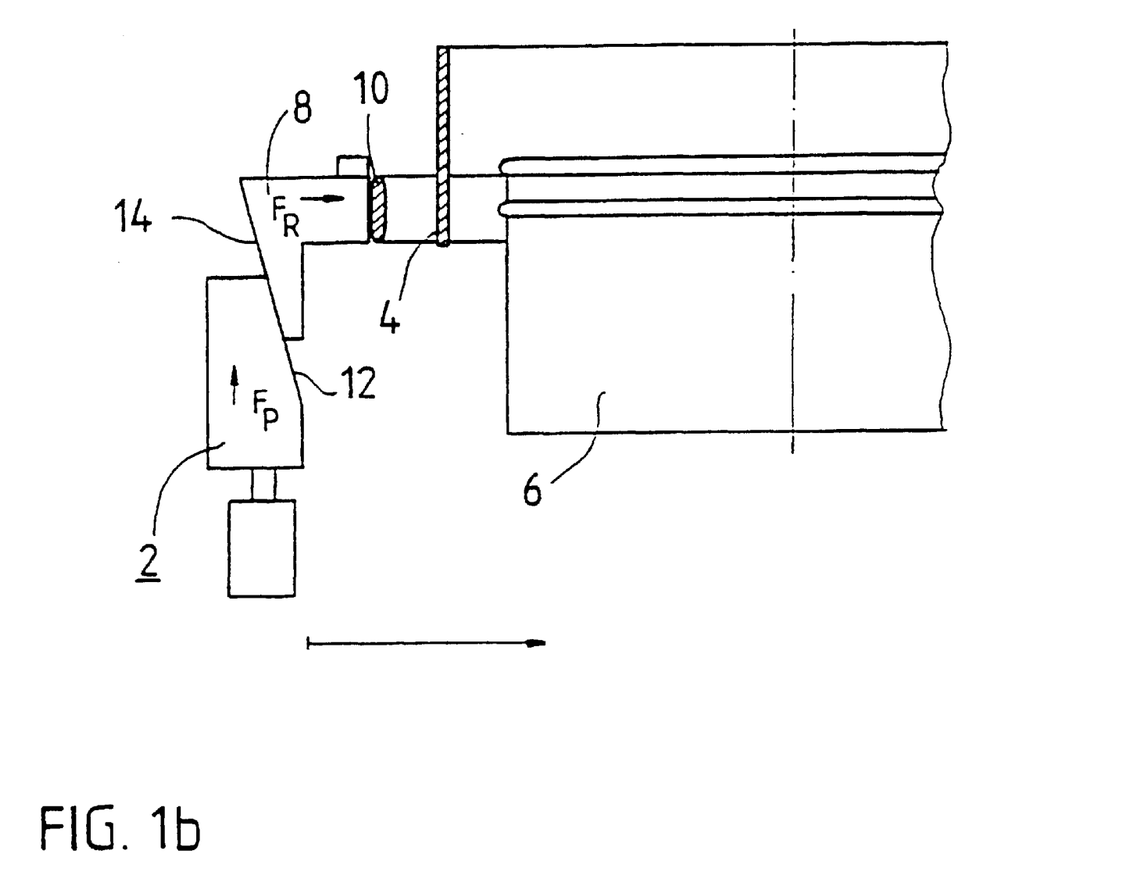
Figure 1C:
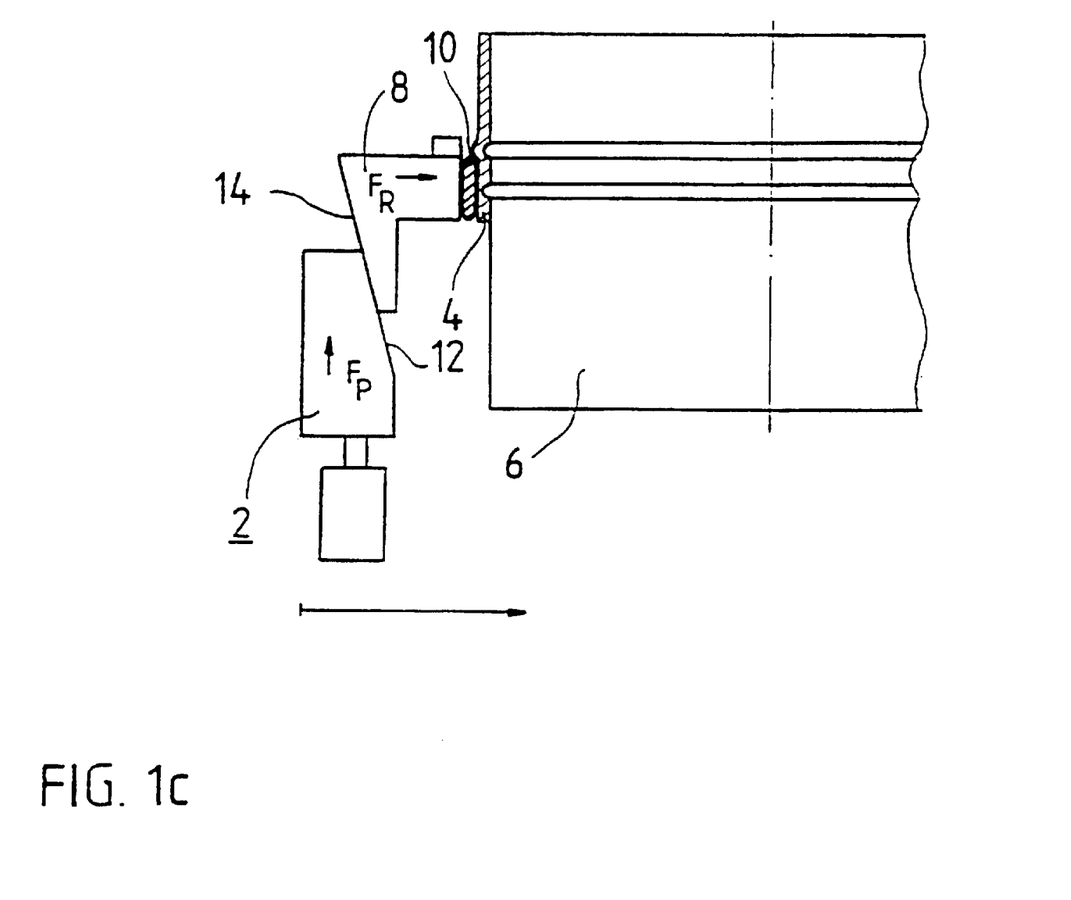

FIG. 1b shows the clamping tool 2 after the clamping jaws 8 have come into contact with the clamping ring 10. With a further moving together of the clamping jaws 8, the clamping ring is first elastically deformed and thereafter plastically deformed. The clamping ring 10 comes into contact engagement against the flexible member 4 and, with a further movement of the clamping jaws toward each other, the inner diameter of the clamping ring 10 and of the flexible member 4 is further reduced until the clamping ring 10 and the flexible member 4 lie on the connecting part 6 free of force and free of play (this state is shown in FIG. 1c).

After the flexible member 4 and the clamping ring 10 come into force-free and play-free contact against the connecting part 6, the clamping jaws 8 are moved further together. In this way, a force is applied on the clamping ring 10, which leads to a further plastic deformation of the clamping ring 10 and to a force between the flexible member 4 and the connecting part 6. Furthermore, the further movement of the clamping jaws 8 toward each other leads to a deformation of the connecting part 6. Together with the following FIGS., it is explained how, in accordance with the method of the invention, a pregiven defined force can be adjusted between the flexible member 4 and the connecting part 6.

Figure 2:
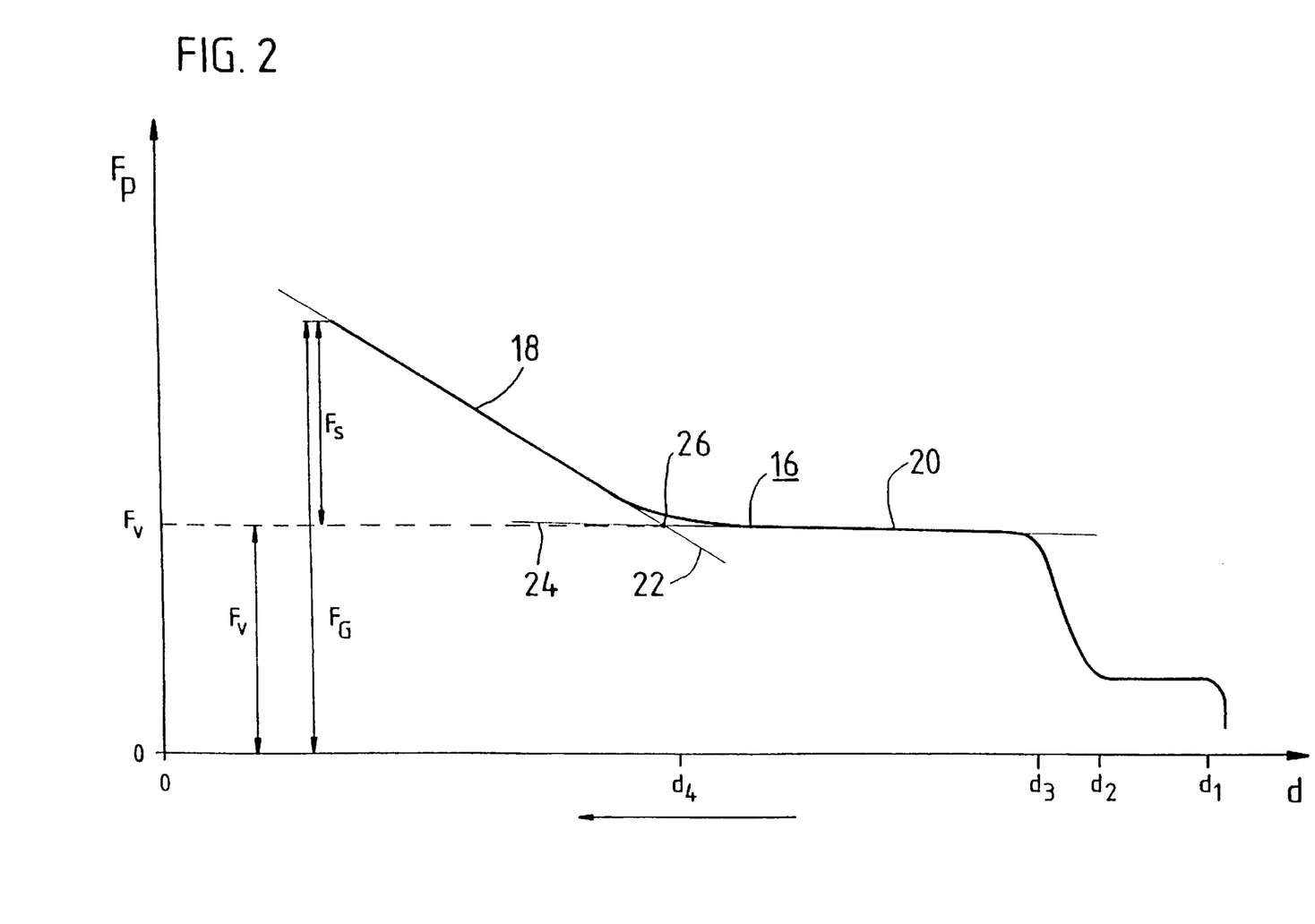
FIG. 2 is a diagram.

FIG. 2 shows a diagram wherein the force $F_P$ is plotted as a function of the diameter (d) between the clamping jaws 8 (an arrow is shown under the axis d for the diameter and this arrow indicates the direction in which the clamping jaws 8 of the clamping tool 2 are moved toward each other, namely, starting from a large diameter between the clamping jaws 8 to smaller diameters). In the diagram, a force/displacement characteristic line 16 is shown, which the clamping tool 2 generates during the movement of the clamping jaws 8 toward each other. The force/displacement characteristic line 16 is recorded with the aid of the force sensor and the displacement sensor. The force/displacement characteristic line is explained as follows: from diameter d1 to diameter d2, the clamping jaws 8 move through an air gap and only the constant sliding friction in the clamping tool 2 must be overcome by the clamping tool 2 (see also FIG. 1a). At the diameter d2, the clamping jaws 8 come into contact with the clamping ring 10, which is elastically deformed with a further moving together of the clamping jaws 8 from the diameter d2 up to the diameter d3.

Starting from the diameter d3, the clamping jaws 8 are moved further together to the diameter d4 and, in this region, a plastic deformation of the clamping ring 10 takes place. Between the diameters d3 and d4, a total force must be accordingly developed by the clamping tool 2 which corresponds to the sum from the friction in the clamping tool 2 and the force needed for the plastic deformation of the clamping ring 10. At the diameter d4, the clamping ring 10 and the flexible member 4 (for whose deformation only negligible forces are needed) come into force-free and play-free contact against the connecting part 6 (see also FIG. 1c). Between the diameters d3 and d4, the force/displacement characteristic line runs substantially in the form of a straight line 20 which has only a slight slope because, up to diameter d4, the force for the plastic deformation of the clamping ring 10 and the force for overcoming the friction in the clamping tool is almost constant over the entire distance traveled.

Starting from the diameter d4, the clamping jaws 8 are moved further together by the clamping tool 2 which leads to a further plastic deformation of the clamping ring 10 and to a force between the flexible member 4 and the connecting part 6. Furthermore, the additional closing movement of the clamping jaws 8 leads to a deformation of the connecting part 6. For this reason, the force/displacement characteristic line starting from the diameter d4 passes into a straight line 18 which has a greater slope than the straight line 20. The slope of the straight line 18 is essentially dependent upon the stiffness of the connecting part 6 (and to a negligible amount on the stiffness of the flexible member 4). Accordingly, the straight line 18 has a slight slope when the connecting part is soft and a large slope when the connecting part 6 is hard.

The above description shows that the range of the force/displacement characteristic line 16 wherein the flexible member 4, the clamping ring 10 and the connecting part 6 lie against each other without force and without play is where the force/displacement characteristic line 16 starts, from a flat running segment (straight line 20), to climb (in order to pass into the straight line 18). A greater diameter between the clamping jaws 8 of the clamping tool 2 lies forward of this region than rearward of this region.

With the aid of the force/displacement characteristic line 16 shown in FIG. 2, the force between the flexible member 4 and the connecting part 6, which force results when moving the clamping jaws 8 toward each other, is determined, for example, as follows. Tangents 22 and 24 are placed on the straight lines 18 and 20, respectively, of the force/displacement characteristic line 16. The tangents 22 and 24 intersect at a point 26 which lies in the region of the force/displacement characteristic line 16, wherein the connecting part 6, the flexible member 4 and the clamping ring 10 lie one against the other without force and without play (that is, in the direct proximity of the diameter d4). After determining the point 26, the force $F_V$, which corresponds to this point, is determined. This force $F_V$ corresponds substantially to the loss force which must be generated by the clamping tool 2 for plastically deforming the clamping ring 10 and for overcoming the internal friction of the clamping tool 2, that is, this loss force does not contribute to generating a force between the flexible member 4 and the connecting part 6.

The determination of the loss force (as well as the following method steps) take place in this and further embodiments in the control unit of the clamping tool 2. The mathematical methods necessary for this (tangent formation, intersect point formation) are known per se.

After the loss force has been determined, the clamping jaws 8 are moved further toward each other with the aid of the clamping tool 2. The total force, which is generated by the clamping tool, is continuously measured in the clamping tool 2 by means of the force sensor and the loss force is subtracted from this total force. The force resulting therefrom corresponds to the force which adjusts between the flexible member 4 and the connecting part 6. If this force reaches a defined force, which is pregiven in the clamping apparatus 2, then the clamping apparatus 2 stops a further movement of the clamping jaws 8 toward each other (in FIG. 2, the total force is identified by $F_G$, the loss force by $F_V$ and the force, which adjusts between the flexible member 4 and the connecting part 6, by $F_S$).

The force/displacement characteristic line 16 can be recorded during a calibration clamping operation and the loss force can then be determined from this characteristic line. The previously determined loss force can then form the basis for the subsequent clamping operations for which the same clamping rings 10, flexible members 4 and connecting parts 6 are used as in the calibration clamping operation. A renewed recordation of the force/displacement characteristic line is in this case only necessary when specific parameters change in the method (when, for example, the friction in the clamping tool has changed or other components, for example, other clamping rings, are to be used in the clamping operation).

Alternatively, it is possible to record the force/displacement characteristic line 16 anew for each clamping operation and to determine anew the loss force from each clamping operation.

Independently of how one proceeds, it is sufficient to start with the recordation of the force/displacement characteristic line 16 at a diameter between the clamping jaws wherein already a plastic deformation of the clamping ring 10 is present because only this region is needed to locate the tangent 24 (a corresponding diameter can be pregiven). The region of the force/displacement characteristic line wherein exclusively the friction in the clamping tool is overcome and an elastic deformation of the clamping ring takes place, is not necessary to determine the tangent 24 and therefore to determine the loss force.

Figure 3:
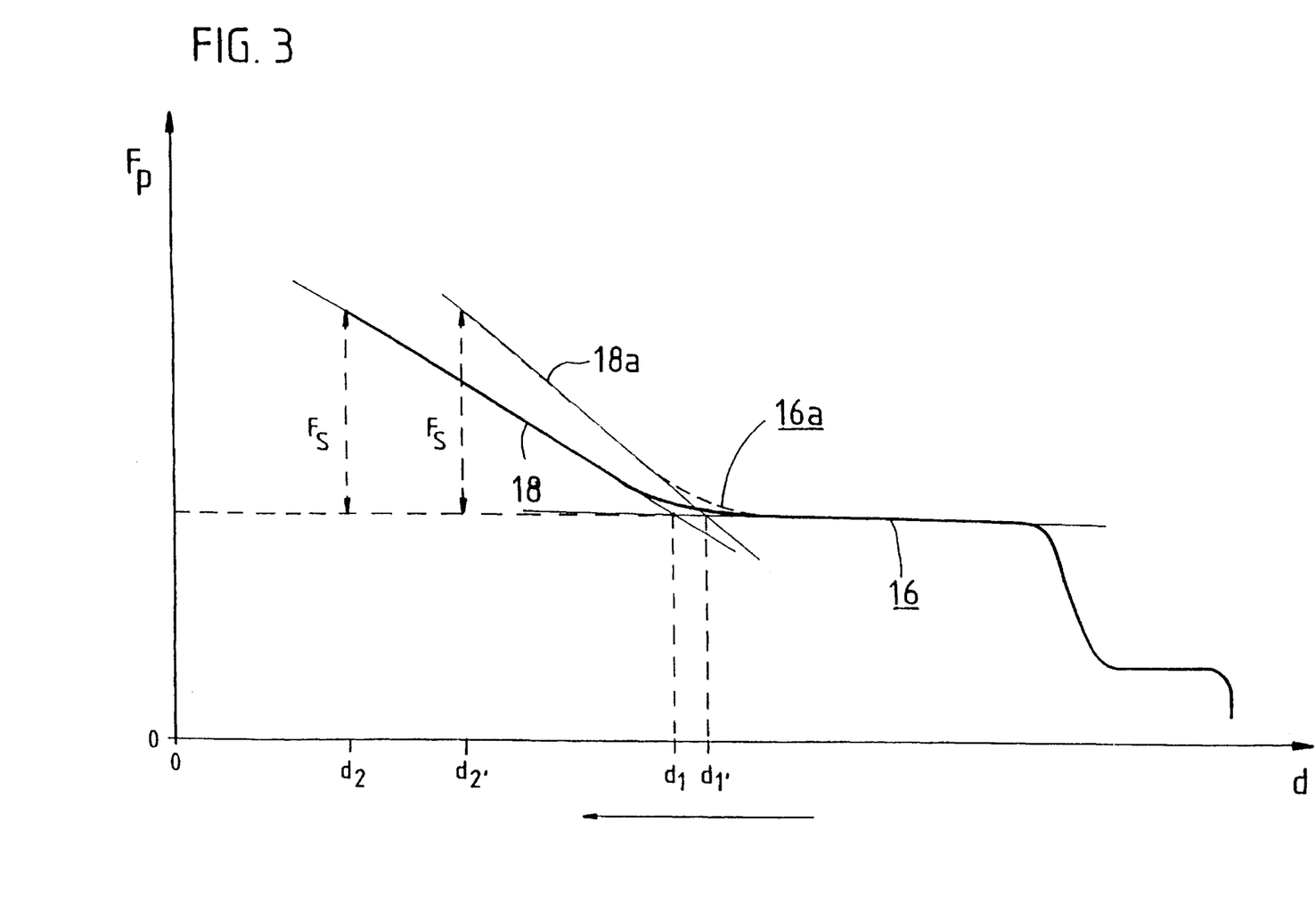
FIG. 3 is a diagram.

FIG. 3 shows a diagram wherein two force/displacement characteristic lines 16 and 16a are drawn. The two force/displacement characteristic lines 16 and 16a show substantially the same trace. The only difference is that a harder connecting part 6 is used in the force/displacement characteristic line 16a and, as a consequence thereof, the straight line 18a runs steeper than the corresponding straight line 18 of the force/displacement characteristic line 16. The loss force is so determined from the force/displacement characteristic lines 16 and 16a as has been explained in connection with FIG. 2. After the determination of the loss force, the clamping jaws 8 are moved further toward each other with the aid of the clamping tool 2 until the force F, which adjusts between the flexible member 4 and the connecting part 6, corresponds to the pregiven force. Only a small part of the path covered by the clamping tool 2 in deforming the connecting part 6 is lost because the connecting part has a great stiffness. This connecting part belongs to the force/displacement characteristic line 16a. Correspondingly, the force F adjusts at a diameter d2', which is greater than the diameter d2, up to which the clamping jaws 8 of the clamping tool 2 must be moved together when one uses the force/displacement characteristic line 16 for a softer connecting part.

Figure 4:
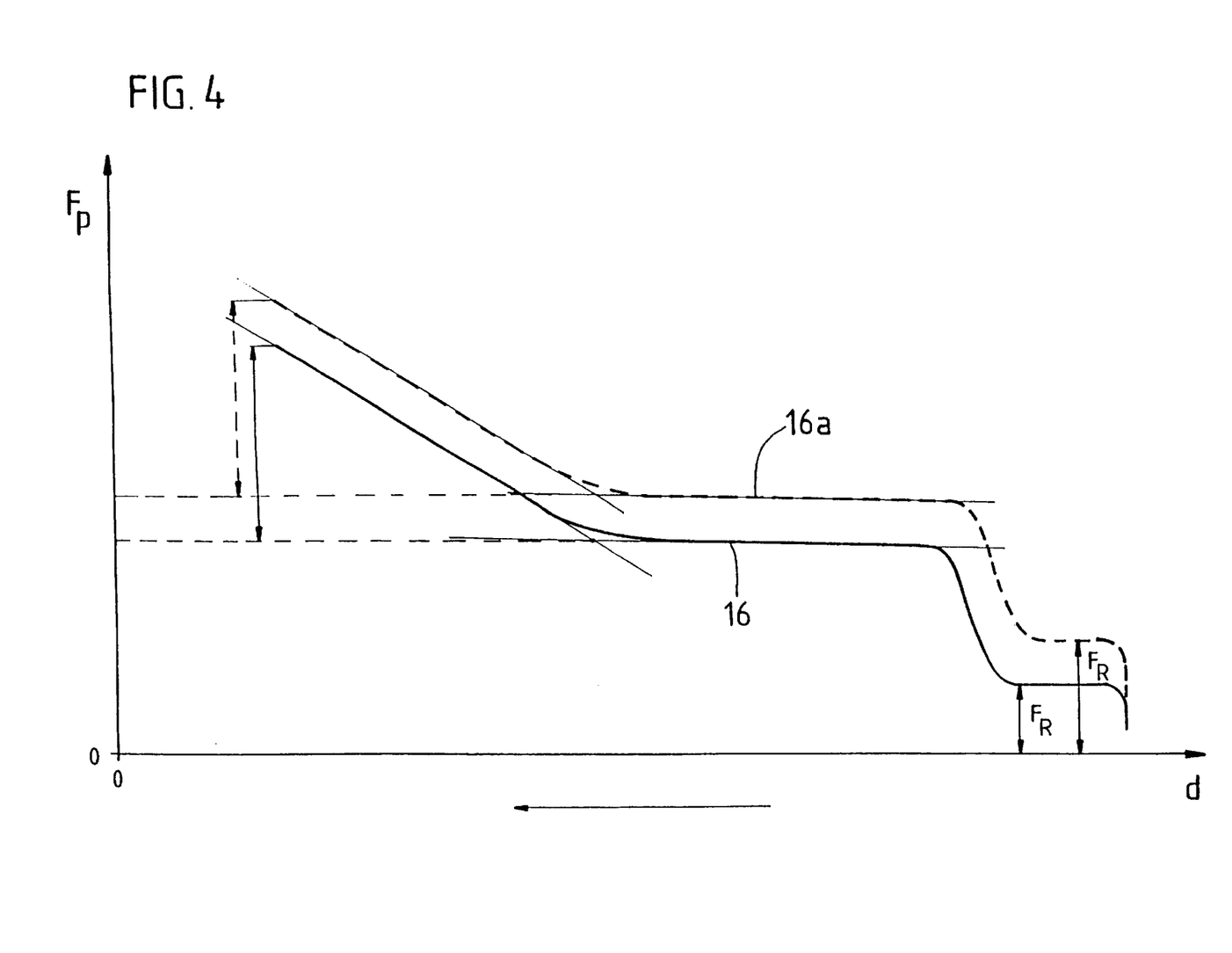
FIG. 4 is a diagram.

FIG. 4 shows a diagram wherein likewise the force $F_P$, which is generated by the clamping tool 2, is plotted as a function of the diameter d between the clamping jaws 8. In this diagram, two force/displacement characteristic lines 16 and 16a are shown. The two force/displacement characteristic lines 16 and 16a have substantially the same trace because they are based on the same connecting parts 6, clamping rings 10, and flexible members 4. The single difference is that the force/displacement characteristic line 16a is shifted upwardly relative to the force/displacement characteristic line 16 because of increased friction in the clamping tool 2 which adjusts in the course of time. If the loss force in the clamping tool is determined on the basis of the force/displacement characteristic lines 16 and 16a in the region wherein the connecting part 6, the flexible member 4 and the clamping ring 10 lie one against the other without force and without play (for example, as was explained in connection with FIG. 2), then the loss force for the force/displacement characteristic line 16a is correspondingly greater than for the force/displacement characteristic line 16 because the force to overcome the friction has increased. Correspondingly, a greater total force must be generated by the clamping tool 2 in order to adjust the pregiven defined force between the flexible member 4 and the connecting part 6 by moving the clamping jaws 8 toward each other.

The friction in the clamping tool 2 increases gradually and therefore, a transition between the force/displacement characteristic line 16 to the force/displacement characteristic line 16a takes place only very slowly during each clamping operation when utilizing the same connecting parts 6, clamping rings 10 and flexible members 4. For this reason, it is sufficient for many attachment operations to use the force/displacement characteristic line 16 to determine the force between the flexible member 4 and the connecting part 6. Only when it is to be expected that, because of an increase of the friction in the clamping tool 2, a new force/displacement characteristic line 16a deviates significantly from the force/displacement characteristic line 16, a new force/displacement characteristic line 16a has to be recorded or the clamping tool has to be serviced so that the friction again reduces. It has been shown that approximately 100 to 10,000 clamping operations can be carried out without carrying out the above-mentioned measures.

Figure 5:
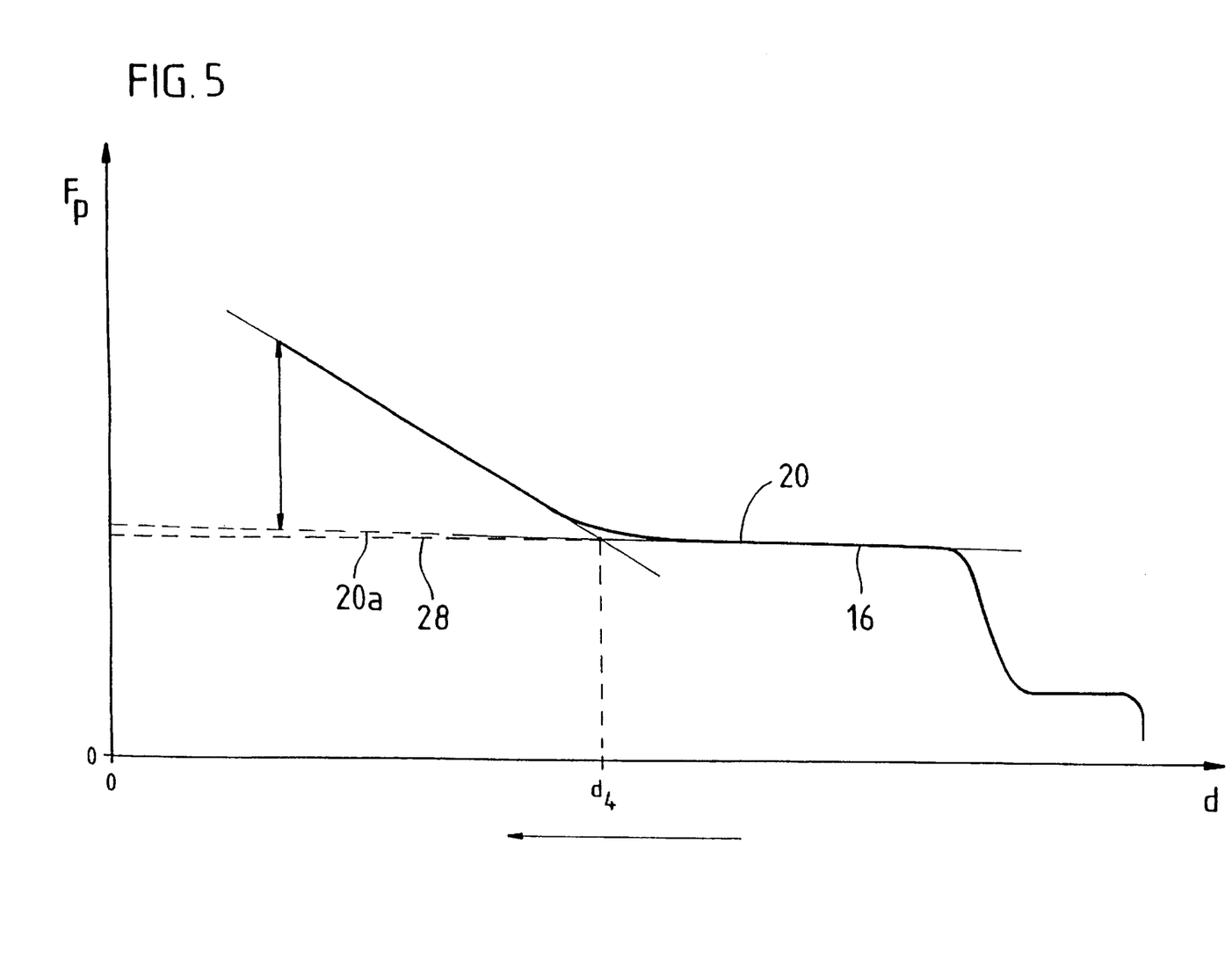
FIG. 5 is a diagram.

FIG. 5 likewise shows a diagram wherein the force $F_P$, which is generated by the clamping tool 2, is plotted as a function of the diameter d between the clamping jaws 8. In the diagram, a force/displacement characteristic line 16 is shown which is coincident with the force/displacement characteristic line shown in FIG. 2. In connection with FIG. 5, it will be explained below how the loss force can be determined alternatively to the method explained in FIG. 2. To determine the loss force, the straight line 20 is extended beyond the region of the diameter d4 whereat the connecting part 6, the flexible member 4 and the clamping ring 10 lie one against the other without force and without play. This is possible because the force/displacement characteristic lines would show a straight line beyond the diameter d4 for a further deformation of the clamping ring 10 without the connecting part 6. When the clamping jaws 8 of the clamping tool 2 are moved together beyond the diameter d4, the loss force can be exactly determined anew for each newly adjusted diameter which is necessary for overcoming the friction in the clamping tool 2 and for the plastic deformation of the clamping ring 10. The loss force determined in this manner is subtracted from the total force, which is generated by the clamping tool 2, during the closing of the clamping jaws 8 of the clamping tool 2 so that that force remains which adjusts between the flexible member and the connecting part. If this force reaches a pregiven defined force, then the clamping jaws 8 of the clamping tool 2 are not moved together any further.

The method, which is presented in combination with claim 5, can also be carried out to determine the loss force in a calibrating clamping operation or alternatively anew during each individual clamping operation.

In FIG. 5, the magnitude of the loss force is shown by the straight line 28 which would result when the determination would be in accordance with the method of claim 2. From the figure it can be seen that the simply determined loss force (as explained in connection with FIG. 2) deviates only insignificantly from the precisely determined loss force.

REFERENCE NUMERALS 2 clamping tool
4 flexible member
6 connecting part
8 clamping jaw
10 clamping ring
12, 14 inclined planes
16 force/displacement characteristic line
18, 20 straight line
22, 24 tangents
28 straight line
30 hydraulic unit
32 displacement sensor

What is claimed is:

1. A method for seal-tight attaching a flexible tube part of elastomeric material, including a flexible member of an air spring to a connecting part with a clamping ring part by radially pressing the clamping ring part with a clamping tool wherein friction is developed during use thereof, the method comprising the steps of:

positioning said clamping ring part, said flexible tube part and said connecting part in said clamping tool so that there is play or slack between said parts preparatory to obtaining a force/displacement characteristic line of said clamping tool;

moving said clamping tool toward and against said clamping ring part so as to cause said clamping ring part to deform and come into contact engagement against said flexible tube part thereby reducing the inner diameter of said clamping ring part and said flexible tube part until said clamping ring part and said flexible tube part lie on said connecting part free of force between said parts and free of said play or slack between said parts while simultaneously recording said force/displacement characteristic line throughout the movement of said clamping tool;

determining a loss force from said force/displacement characteristic line which loss force is a force needed to overcome said friction in said clamping tool and to deform said clamping ring part until said clamping ring part and said flexible tube part lie on said connecting part free of force between said parts and free of said play or slack between said parts; and, adjusting an applied force, which exceeds said loss force, so that said applied force corresponds to a pregiven force between said flexible tube part and said connecting part to ensure a reliable clamping connection of said flexible tube part to said connecting part after said applied force is applied to said clamping ring part.

2. The method of claim 1, wherein the loss force is determined at a region of said force/displacement characteristic line wherein the clamping tool is closed so far that said parts lie one against the other without force between said parts and without said play or slack between said parts.

3. The method of claim 2, wherein the force/displacement characteristic line runs substantially in the form of a straight line before and after said region wherein said parts lie one against the other without force between said parts and without said play or slack between said parts; said straight line has segments having respectively different slopes; and, the loss force is determined at point whereat said segments or respective extensions thereof intersect.

4. The method of claim 1, wherein said force/displacement characteristic line extends substantially in the form of a straight line with straight line segments before and after a region wherein the clamping tool is closed so far that said parts lie one against the other without force between said parts and free of said play or slack between said parts; the straight line segments have respective different slopes; and, the loss force is determined as follows:

the straight line segment forward of the region wherein said parts lie one against the other free of force and free of play is extended in a straight line beyond this region; and, for each displacement which the clamping tool has gone beyond the above-mentioned region, the loss force corresponding to said displacement is determined from the extended straight line segment.

5. The method of claim 1, wherein the determined force/displacement characteristic line is newly recorded in time intervals for determining the loss force.

6. The method of claims 1, wherein the force/displacement characteristic line is instantaneously recorded during the clamping of a clamping ring and that this instantaneous force/displacement characteristic line forms the basis for the determination of the loss force during the clamping of the clamping ring part.

7. The method of claim 1, wherein the recording of the force/displacement characteristic line is begun before the clamping tool comes into contact with the clamping ring part.

8. A clamping tool for carrying out a method for seal-tight attaching a flexible tubing part of elastomeric material, including a flexible member of an air spring to a connecting part with a clamping ring part by radially pressing the clamping ring part with a clamping tool, the method including the steps of: positioning said clamping ring part, said flexible tube part and said connecting part in said clamping tool so that there is play or slack between said parts preparatory to obtaining a force/displacement characteristic line of said clamping tool; moving said clamping tool toward and against said clamping ring part so as to cause said clamping ring part to deform and come into contact engagement against said flexible tube part thereby reducing the inner diameter of said clamping ring part and said flexible tube part until said clamping ring part and said flexible tube part lie on said connecting part free of force between said parts and free of said play or slack between said parts while simultaneously recording said force/displacement characteristic line throughout the movement of said clamping tool; determining a loss force from said force/displacement characteristic line which loss force is a force needed to overcome the friction in said clamping tool and to deform said clamping ring part until said clamping ring part and said flexible tube part lie on said connecting part free of force between said parts and free of said play or slack between said parts; and, adjusting an applied force, which exceeds said loss force, so that said applied force corresponds to a pregiven force between said flexible tubing part and said connecting part to ensure a reliable clamping connection of said flexible tube part to said connecting part after said applied force is applied to said clamping ring part, the clamping tool comprising:

means for determining the force which the clamping tool generates during the time that the clamping jaws are moved toward each other;

means for determining the displacement which the clamping jaws cover during the closing of the clamping jaws; and, means for recording and evaluating a force/displacement characteristic line.

* * * * *